Aug. 30, 1966  J. R. WILLSON  3,269,651
PROBE COOKING APPARATUS
Filed July 6, 1962  5 Sheets-Sheet 1
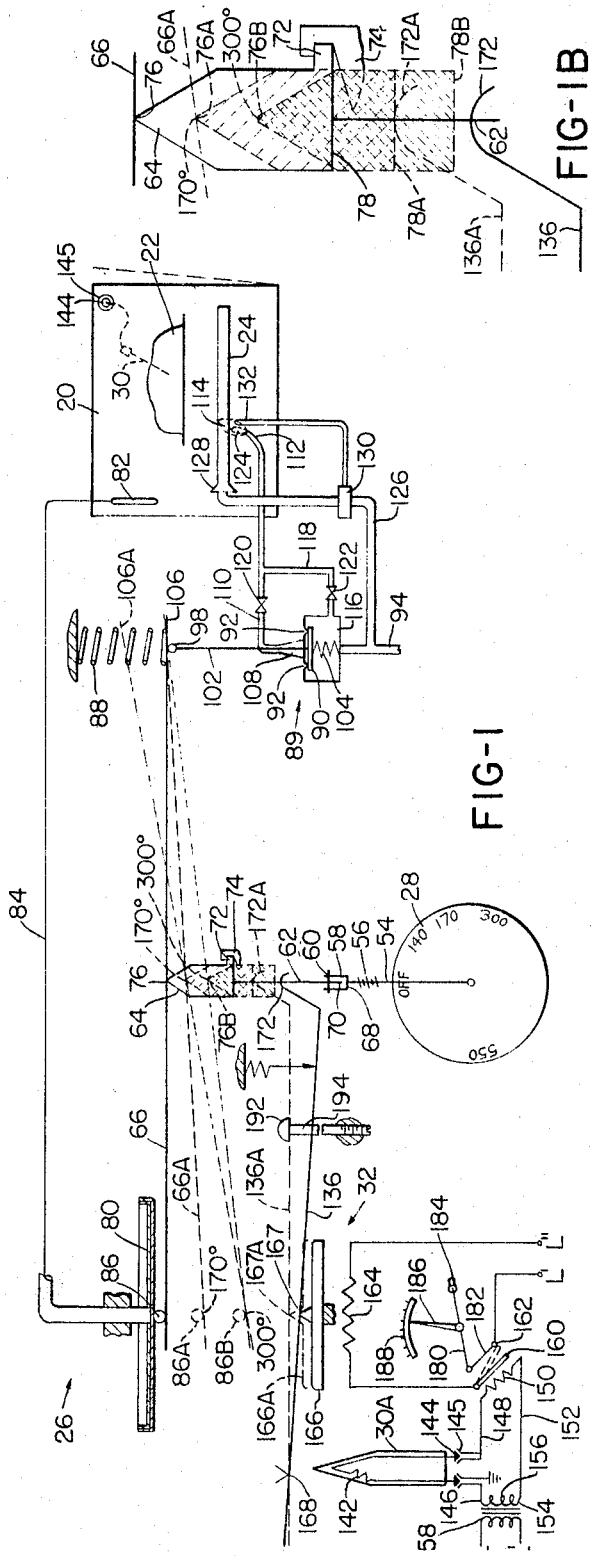
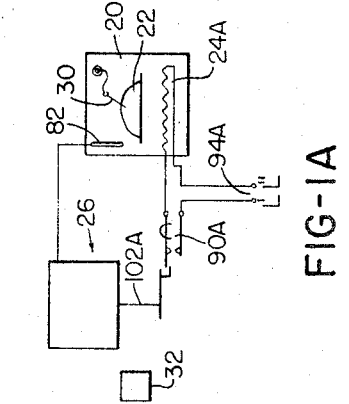
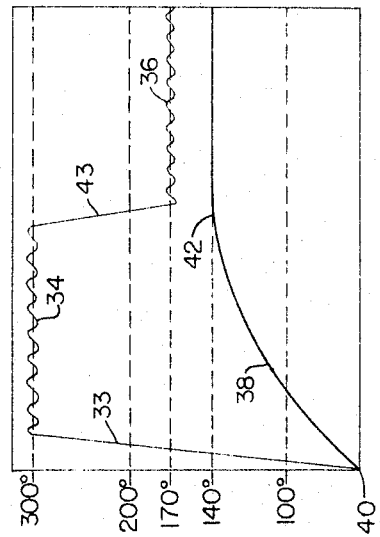
INVENTOR.
JAMES ROBERT WILLSON
BY
Robert R. Lander
HIS ATTORNEY Aug. 30, 1966  J. R. WILLSON  3,269,651
PROBE COOKING APPARATUS
Filed July 6, 1962
5 Sheets-Sheet 2

INVENTOR.
JAMES ROBERT WILLSON
BY
*Robert R Candor*
HIS ATTORNEYS

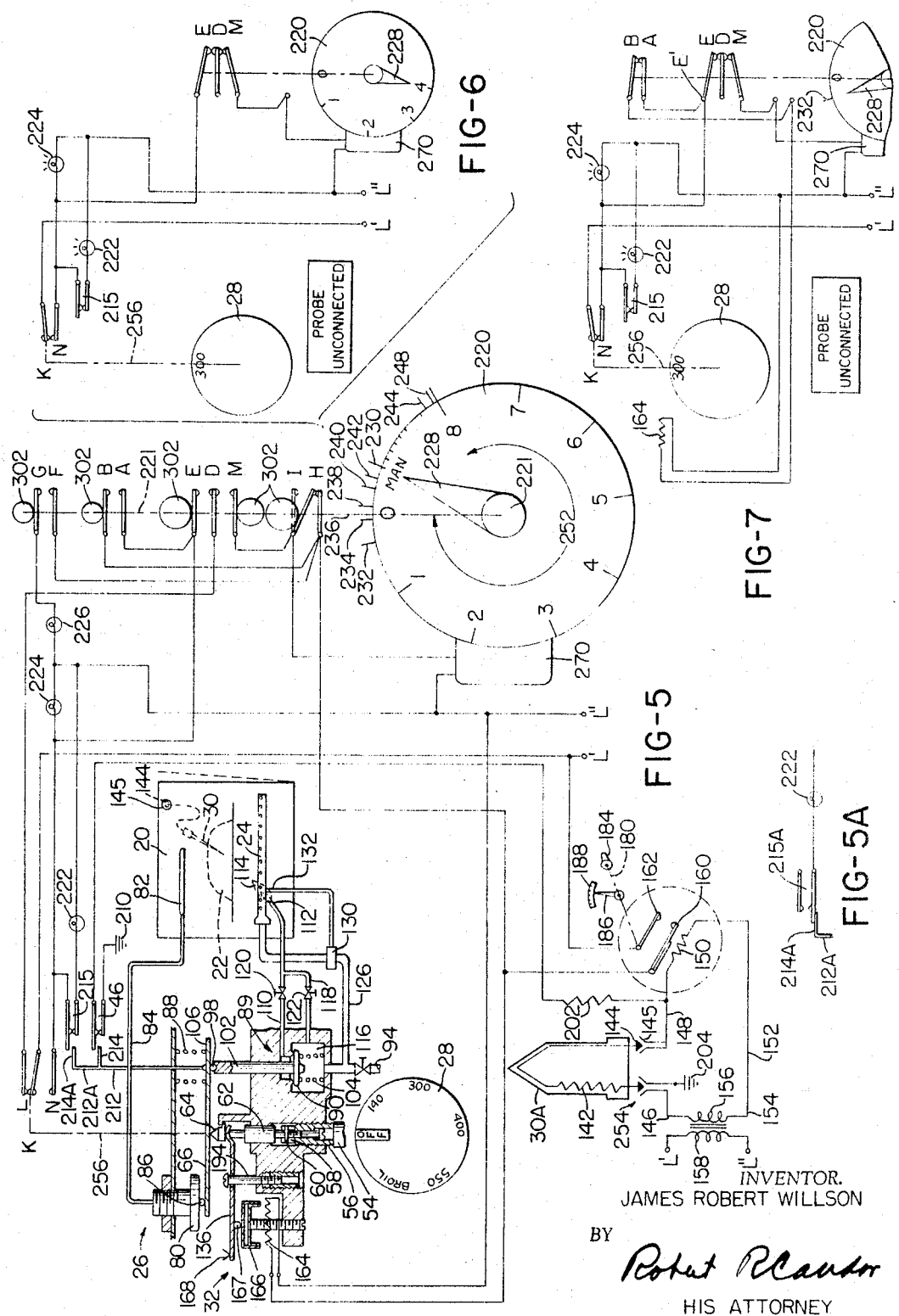

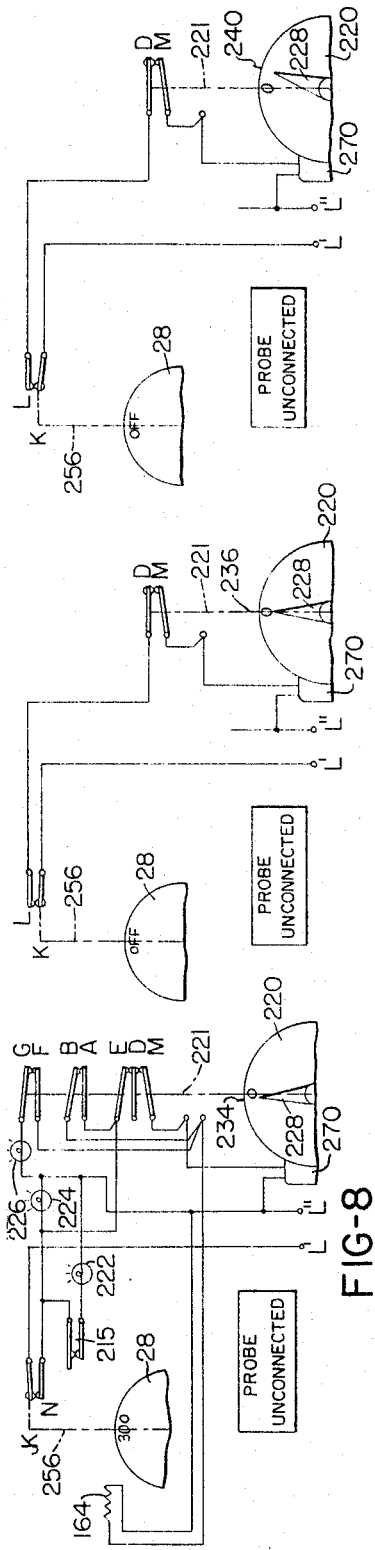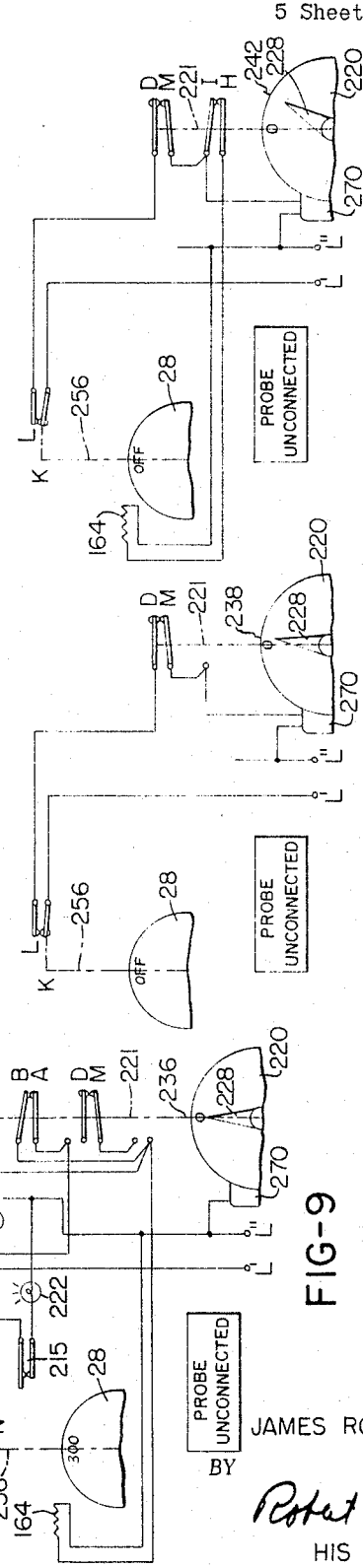

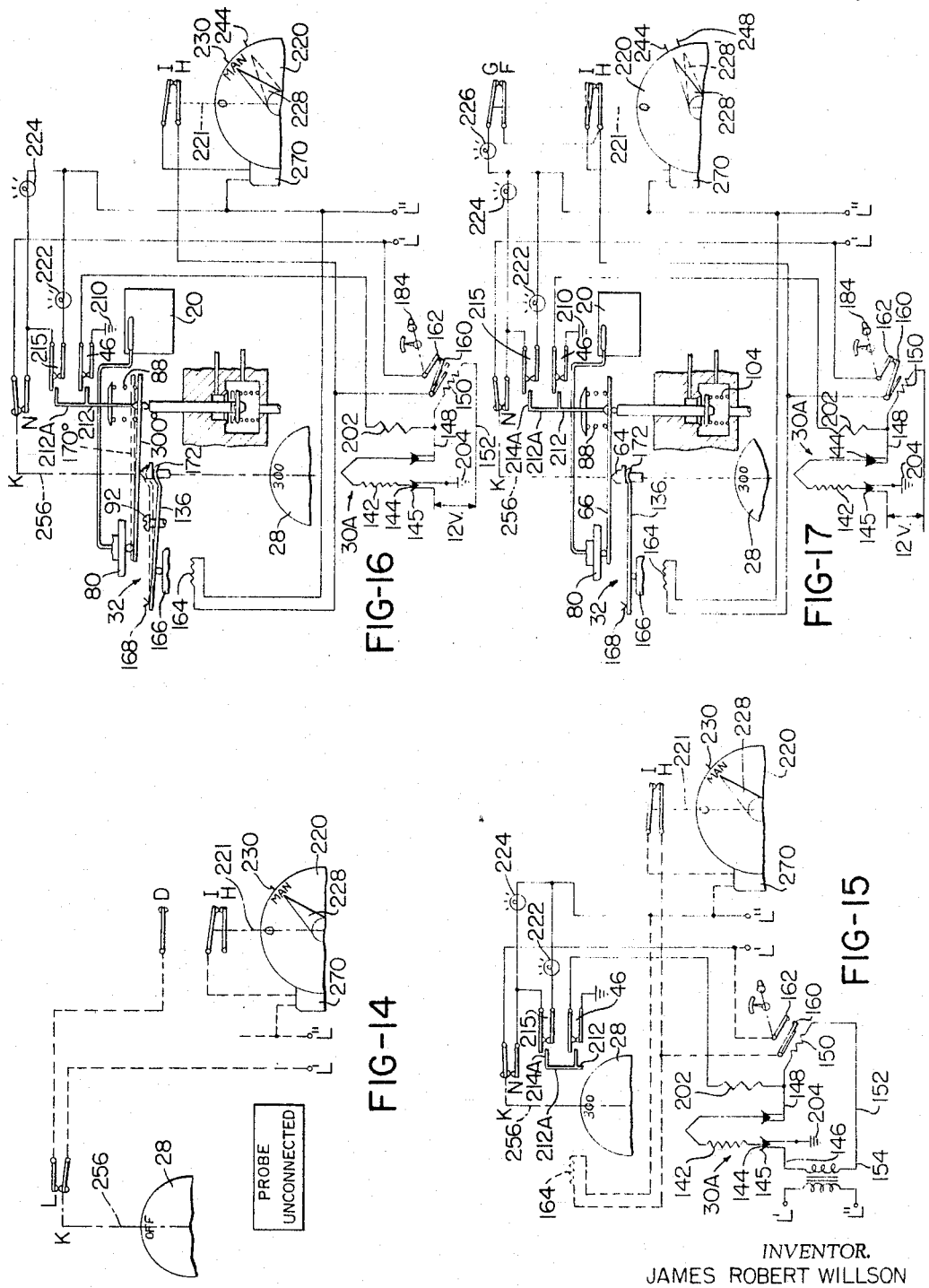

United States Patent Office 3,269,651
Patented August 30, 1966

3,269,651
PROBE COOKING APPARATUS
James Robert Willson, Greensburg, Pa., assignor to Robertshaw Controls Company, Richmond, Va., a corporation of Delaware
Filed July 6, 1962, Ser. No. 207,912
2 Claims. (Cl. 236—15)

This invention relates to probe apparatus for cooking.

According to this invention, an article to be cooked, such as a roast of meat and the like, may be cooked in a cooking device, such as an oven. Such article may be cooked solely under the control of a thermostat, under the combined control of a thermostat and a timer, or under the combined control of a thermostat and a probe or other article temperature sensing member.

The thermostat, timer and probe may all be provided selectively to control the oven. They may be used selectively to produce any of the cooking conditions described in the preceding paragraph.

According to this invention, a roast of meat and the like may be cooked or roasted in an oven automatically at a selected roasting temperature of 300° F. or 325° F., more or less, and may then be maintained automatically at a non-cooking, but palatable, heated temperature of 170° F., more or less, at which temperature it remains palatable for a surprising length of time without any further perceptible cooking action. Bacterial spoilage is prevented at this time.

The change from high temperature (300° F. or 325° F.) to low temperature (170° F. more or less) may be produced automatically and selectively either by timer action, or by probe action, as desired.

Because of this a user may place a roast in the oven, set the thermostat at 300° F. or 325° F., for example, at 10 a.m., and set the timer at the estimated length of time (number of hours and minutes) required to cook the roast, and may then leave the house, if desired. The oven temperature starts to rise and soon is at the selected relatively high temperature, such as 300° F. or 325° F. and prevents any bacterial spoilage. This temperature cooks the roast, and the timer then automatically reduces the temperature to 170° F., more or less, after the time selected by the user. This reduces any further material cooking action, maintains the roast at a palatable temperature and prevents any spoilage of the roast. The roast may be palatably served at any desired time after it has cooked, even several hours later, such as at 6 p.m.

The user may use the probe instead of the timer at 10 a.m., for example, to change the thermostat temperature from 300° F. or 325° F. to 170° F. more or less. For this purpose, the probe is inserted in the roast and the probe connector is inserted in the probe connector receptacle. The probe system is adjusted to the desired "doneness" temperature. The timer is placed or remains at "MANUAL." The probe automatically reduces the thermostat temperature from 300° F. or 325° F. to 170° F. when the roast is sufficiently cooked, and the roast is thereafter maintained at this temperature.

The user may select a probe controlled operation wherein the probe may be set to be responsive to an internal temperature of the roast and the like which is materially below the selected final internal temperature of such roast or the like. The probe then controls the thermostat and the heating means quickly to heat the oven to the selected high temperature, such as 300° F.–325° F. The oven temperature then is automatically maintained at such high temperature until the internal temperature of the roast reaches, for example, 80° F. The probe then automatically reduces the heating action of the heating means but maintains a cooking temperature while gradually reducing the oven temperature from such high temperature to a low, keep warm temperature, such as 170° F., while the internal temperature of the roast at the same time gradually reaches 140° F. In doing this the probe automatically decreases the length of the heating cycles of the heating means and increases the length of the off cycles of the heating means so the oven temperature gradually drops to the keep warm temperature 170° F., while the roast has continued to cook until the internal roast temperature substantially at the same time reaches 140° F. The roast is cooked to produce a very palatable condition which is then indefinitely maintained by the keep warm temperature.

Accordingly, it is an object of this invention to provide a cooking apparatus having one or more of the features disclosed in this application.

Another object of this invention is to provide a method of cooking having one or more of the features disclosed in this application.

Other objects of this invention are apparent from this description, from the claimed subject matter, and/or from the accompanying drawings in which:

FIGURE 1 is a diagrammatic representation of an oven sysem having an oven thermostat, a probe, and a circuit responsive to probe temperature to modify the operation of the oven thermostat.

FIGURE 1A shows diagrammatically a system of the same general arrangement as in FIGURE 1, but having an electrical heating system instead of a fuel or gas system.

FIGURE 1B is an enlarged showing of a portion of FIGURE 1.

FIGURE 2 is a temperature diagram showing the oven and meat temperatures produced by the system shown in FIGURE 1.

FIGURE 5 is a diagrammatic representation of another oven system having the features of the system of FIGURE 3 with a timer capable of reducing the oven thermostat temperature setting in lieu of the probe and with the oven thermostat set at "OFF" position, with the timer set at "MANUAL" position, and with the probe unconnected.

FIGURE 5A shows another embodiment of a switch shown in FIGURE 5.

FIGURE 6 shows parts of FIGURE 5 with the thermostat set at a normal rapid cooking temperature, such as 300° F., with the timer set at a timing position, such as four hours, and with the probe unconnected.

FIGURE 7 is a view somewhat similar to FIGURE 6, but with the timer having automatically moved to the oven thermostat temperature reducing position.

FIGURE 8 is a view similar to FIGURE 7, with the oven "hold" light energized to indicate that the low temperature cooking has been completed.

FIGURE 9 is a view somewhat similar to FIGURE 8, but with the timer having been de-energized.

FIGURE 10 is a view somewhat similar to FIGURE 9, but with the thermostat having been turned to the "OFF" position, at the end of the cooking operation of FIGURES 6–9.

FIGURES 11 and 12 show the timer being moved from the "ZERO" position by the turning off of the thermostat in FIGURE 10.

FIGURE 13 is a view similar to FIGURE 12 and showing the system with the timer in operation a few seconds before the timer reaches the manual position and placing the system in condition to accept probe operation.

FIGURE 14 shows the system a few seconds after FIGURE 13, with the timer having been stopped in the manual position, ready to accept probe operation, or for oven inactive condition for an indefinite period of time until some subsequent use.

FIGURE 15 shows the system with the probe plug having been inserted into the probe connection and with the probe having been inserted into an article, such as a roast, and with the thermostat having been set at a cooking or roasting temperature, such as 300° F.

FIGURE 16 shows the operation at a subsequent interval of time from that of FIGURE 15, and when the probe circuit has become effective to modify the oven operation.

FIGURE 17 shows the system at an interval of time subsequent to that of FIGURE 16, when the article such as a roast has reached a condition of almost complete cooking, and, in dotted position, showing the completion of the cooking operation for holding the article in heated condition for an indefinite period of time, if desired.

Figure 3:
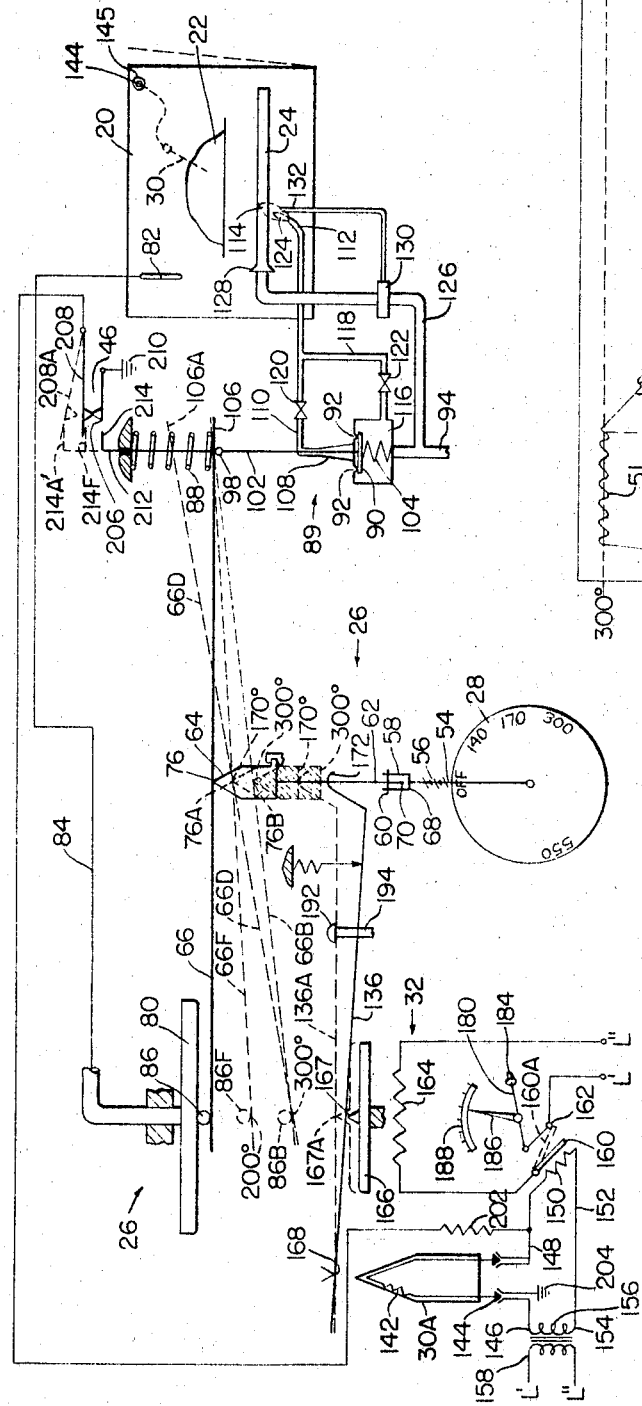
FIGURE 3 is a diagrammatic representation of another oven system somewhat similar to the system of FIGURE 1, but showing an anticipating circuit to cause the probe to become operative at a lower meat or other article temperature and then gradually to become operative at a higher meat or other article temperature.

In FIGURE 1 a system is shown in which an oven 20 may receive an article 22 to be cooked, baked, or roasted. Heating means 24 are provided to heat the oven 20. Thermostatic means 26 are provided for controlling the operation of the heating means or burner 24 to maintain a first cooking temperature in the oven 20. For example, such first cooking temperature may be a relatively high temperature, such as 300° F., more or less, as selected by the thermostatic knob 28. A probe 30 is insertable into the article 22, as indicated in the oven 20. The probe 30 actuates a modifier 32 which modifies the thermostat 26 automatically to change the operation of the oven thermostat to maintain a second cooking temperature in the oven 20. Such second cooking temperature may be a lower temperature than the first cooking temperature. For example, if the first oven temperature is 300° F., more or less, then the second temperature may be 170° F., more or less.

FIGURE 2 shows temperature chart portion 34, indicating a 300° F. oven temperature, for example, for a first period of time and another temperature chart portion 36 indicating the second cooking temperature at 170° F. The curve or line 38 shows the internal temperature of the article, such as a roast of meat, as sensed by the probe 30, starting with a cold oven temperature at any starting temperature 40 and gradually rising as the oven temperature is maintained at 300° F., more or less, and rising to an internal temperature of 140° F., more or less, which causes the probe 30 to modify the thermostat 26 by modifier 32 to change the heating operation and maintain the oven at 170° F., as shown at 36, for an indefinite length of time. The internal temperature of the article 22 continues substantially at 140° F. until the article or roast is removed from the oven. For many purposes, this is a satisfactory operation.

FIGURE 3 shows a system somewhat similar to that of FIGURE 1, in which the members 20 through 32 operate substantially the same as in FIGURE 1. However, the modifier 32 includes a switch 46 which cooperates with switch contacts 160, 162, to cause a probe control action which may become effective at a lower temperature than the desired 140° F. temperature, and which causes the modifying action to take place at such lower temperature, such as at 80° F., which then gradually changes the operation of the thermostat 26 so its temperature control action gradually diminishes from the oven temperature from the 300° F. setting when the internal temperature of the article 22 reaches 80° F. at 48.

Figure 4:
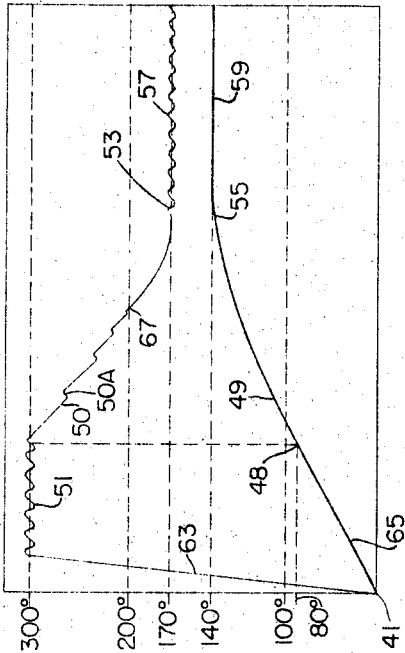
FIGURE 4 is a temperature diagram showing the oven and meat temperatures produced by the system of FIGURE 3.

FIGURE 4 shows how the oven temperature is cycled downwardly, as indicated at 50. The switch 46 and contacts 160 and 162 are modified by the action of the probe 30. The thermostat 26 eventually is modified to a final selected temperature of 170° F., as indicated at 57, FIGURE 4. The internal temperature of the article or roast 22 gradually rises from an initially low temperature at 41 to the 80° F. temperature which initiates the downward temperature cycles 50. The internal temperature of the roast continues to rise, as indicated at 49, until it reaches substantially 140° F. at 55, which temperature is held indefinitely until the roast is removed from the oven.

In FIGURE 5 a system is shown which adds a timer to the control of FIGURE 3. It is shown in a completely deenergized condition and in readiness to be used in any one of the several procedures which may be used for cooking in an oven, such as under the control of the oven thermostat with or without timer control, or with or without probe control, as more fully elsewhere described.

FIGURE 5A shows another embodiment of a switch for controlling the oven ready light shown in FIGURE 5 to cause such light to be energized when the oven temperature has reached a temperature slightly before the "set point."

FIGURE 6 shows the system of FIGURE 5 after it has been adjusted to produce a cooking operation without modification by a probe and the like. As shown in FIGURE 6, the oven will operate for approximately four hours, with the major portion of the cooking period maintained at the selected temperature of 300° F., or the like, for a period of four hours and with a final lower temperature cooking taking place at transition temperature between first and final temperature.

FIGURE 7 shows the system of FIGURE 5 as it has progressed from the setting of FIGURE 6 to the time when the thermostatic action is automatically set to reduce the oven temperature for the final twenty minutes, more or less.

FIGURE 8 shows a subsequent step in the lower temperature cooking which originated in FIGURE 7 and in which a warning signal or "hold" light has been energized to indicate that the estimated cooking period of time has elapsed.

In FIGURE 9, the timer has been stopped and the "hold" light is maintained in the lighted condition to indicate that the low temperature keep warm temperature will continue until the user elects to turn the thermostat to the "OFF" position.

In FIGURE 10, the thermostat has been turned to the "OFF" position after the completion of the cooking operation in FIGURE 9, and the timer will now proceed to set itself automatically to the manual position.

FIGURES 11 and 12 show the timer automatically moving toward the manual position without altering the circuit which is being controlled.

FIGURE 13 shows the circuit just a few seconds before it reaches the manual position of FIGURES 5 and 14, where no cooking is now being produced and in which the system is now ready to be changed for any other desired operation.

In FIGURE 5 all of the circuits and wires are shown, and in FIGURES 5-14 only those portions of the wires are shown which are live in the sense that they are connected by closed switches to the lines L' and L".

In FIGURE 15 the system which previously was in the condition of FIGURES 5 or 14 has now been changed for probe operation by the plugging in of the probe, by the insertion of the article into the oven and the probe in the article. The thermostat has been set at a selected normal cooking or roasting operation, such as 300° F., more or less. The system of FIGURE 15 will proceed to cook the article or roast at the selected temperature of 300° F. until the internal temperature of the article or meat, as sensed by the probe reaches a lower control temperature such as 80° F., which has been found to be the proper temperature for a normal roast to be continued to be cooked, but at a gradually reducing temperature of the oven.

In FIGURE 16 the meat probe circuit starts cycling the thermostat temperature reducer and the timer, gradually to reduce the temperature of the oven near to the acceptable holding temperature, at which the oven may be maintained, and at which the roast may be maintained in a desirable heated condition for a relatively long period of time.

FIGURE 17 shows the condition of the circuit after such temperature has been reached where the internal temperature of the article roast is sufficiently high to indicate the accepted degree of cooking, with the exception that a further 30-minute interval of time may be measured or a signal may be illuminated or energized to indicate the complete cooking of the roast.

FIGURES 1 and 2 are now described in more detail.

The oven thermostat 26 may be of any suitable type capable of controlling energy for heating an oven or the like, such energy being either in fuel form, such as gaseous form, or in electrical form, as desired.

The thermostat 26 may have a knob 28 which may be set from any "OFF" position to any temperature position, such as between 140° F. and 550° F. The knob 28 rotates the shaft 54 and raises or lowers such shaft 54 by a screw thread construction 56. The shaft 54 has a fork 58 which is raised and lowered with the shaft 54. The fork 58 rotates a pin 60, which is attached to an upper shaft 62. The upper end of the shaft 62 has a thermostat arm engaging head 64, which engages the thermostat arm 66. The vertical position of head 64 ordinarily is determined by the upward and downward movement of the shaft 54, as it is raised or lowered by the threads 56. The bottom 68 of the fork 58 ordinarily engages the bottom 70 of the upper shaft 62 at all positions except the "OFF" position, so that upward and downward movement of the shaft 54 by the threads 56 causes a corresponding movement up and down of the shaft 62 and head 64 to determine the temperature setting of the head 64.

The head 64 has a lifting arm 72 which engages a cam 74 at the "OFF" position which lifts the head 64 a slight distance, so that the lower end 70 of the shaft 62 is lifted from the bottom 68 of the fork 58. At all other positions at the knob 28, the bottom 70 of shaft 62 rides on the bottom 68 of the fork 58 and the head 64 is lifted up and down by the threaded construction 56.

For example, when the knob 28 is at 170° F., the apex 76 of the knob 64 is at 76A, FIGURE 1B. When the knob 28 is at 300° F., the apex 76 is at 76B. Likewise, the bottom 78 of the head 64 is at the upper-full-line position at the "OFF" position of knob 28. At the 170° F. position of knob 28, the bottom 78 is at 78A, and at the 300° F. position of the knob 28, the bottom 78 is at the position 78B.

It is thus to be seen that the fulcrum point 76 of the thermostat arm 66 is at the topmost position in the "OFF" position of the knob 28. This may be an overshoot position with the right end 106 slightly above ball 98. The fulcrum point is at the 76A position for the 170° F. setting of the knob 28, and is at the 76B position for the 300° F. setting of the knob 28.

A diaphragm or bellows 80 is expanded and contracted in response to temperatures in the oven 20 by a bulb 82 which has its thermostatic fluid connected by the tube 84 with the interior of the diaphragm or bellows 80. When the temperature of the oven 20 rises and heats the bulb 82, the diaphragm or bellows 80 expands and when the oven cools, the diaphragm 80 contracts. For example, at normal room temperatures of the oven 20 and bulb 82, the fulcrum ball 86 of the bellows 80 is in the full-line position. When the oven 20 and the bulb 82 are at 170° F., the ball 86 is at position 86A. When the bulb 82 is at 300° F., the fulcrum ball 86 is at position 86B.

The ball 86 and the spring 88 hold the thermostat arm 66 downward against the fulcrum point 76 of head 64 at all times. The thermostat arm 66 rocks about the fulcrum 76 in response to the upward and downward movement of the thermostatic ball 86.

A thermostatic valve 89 is opened by downward movement of the valve plunger 90 to disengage the valve seat 92. When the plunger 90 is in open position, then energy, in the form of gas, from the supply 94 may, directly or indirectly, be fed to the burner 24 in the oven 20 to heat the oven. When the plunger 90 closes, then the burner 24 is turned off or down to stop the heating operation.

The opening and closing of the valve 89 is produced in response to the movement of thermostat arm 66, and for this purpose the right end 106 of arm 66 may engage a fulcrum ball 98 which is pushed upwardly by a valve stem 102 by the upward push of compression spring 104. Hence any downward movement of the right end 106 of the thermostat arm 66 opens the valve 89 when the arm 66 moves below the full-line position at the right end 106. The right end 106 of the arm 66 may be lifted upwardly above the top full-line position of ball 98 to overshoot positions, such as position 106A, where the end 106A of the arm 66 is materially above ball 98. The ball 98 can not rise above the full line position of FIGURE 1 because of the upward seating of the valve plunger 90.

Any type of connection between the valve construction 89 and burner 24 may be provided to control the action of the burner 24. By way of example, FIGURE 1 shows a diagrammatic representation of a connection which may be provided with a single pilot nozzle 112, if desired.

For example, the discharge passage 108 of valve 89 may be connected by pilot tube 110 with the pilot nozzle 112. When the valve 89 is open, by downward movement of plunger 90, a relatively large pilot flame 114 is produced because of the relatively large amount of gas which is discharged through the pilot tube 110.

The upstream gas space 116 may be connected by the bypass pilot tube 118 to the pilot tube 110 and to the nozzle 112. The regulating valves 120 and 122 may be regulated, so that gas from the pilot tube 110 produces the large flame 114. The small standby flame 124 is produced when the valve plunger 90 closes, and a relatively small volume of gas can pass only through the bypass pilot tube 118 and from thence to the nozzle 112 because of the throttling action of the valve 122. Hence the large pilot flame 114 is produced when valve 89 is open and small pilot flame 124 is produced when valve 89 is closed.

The burner 24 may be supplied with burner gas by the burner gas pipe 126, under the indirect control of thermostat 26. The pipe 126 may discharge into the gas-air mixer 128, and then into the burner 24.

The flow of gas through the pipe 126 may be controlled by a quick opening and closing burner valve 130, which is opened when the large pilot flame 114 heats the mercury bulb 132. When the flame is reduced to the standby size of 124, then the mercury bulb 132 is not heated by small pilot flame 124. The bulb 132 cools and closes the valve 130 and extinguishes the burner 24.

If desired, the burner 24 may be cycled by throttling down and turning on higher, instead of by completely turning on and off as is obvious.

If desired, the oven 20 may be heated by electrical means instead of by fuel or gas, as is shown diagrammatically in FIGURE 1A. For example, the thermostat 26 which may otherwise be substantially the same as in FIGURE 1, and may operate the stem 102A of FIGURE 1A in the same manner as valve stem 102 in FIGURE 1. The stem may open and close the snap switch 90A instead of the valve 90. Any electrical power source, such as 94A, may be connected and disconnected to and from the electric heater system 24A to heat the oven 20, so that the temperature therein rises and falls and heats and cools the bulb 82 substantially the same as in FIGURE 1. The thermostat construction 26 may thus turn on and off the electric heater 24A. The modifier 32 of FIGURE 1A may be operated substantially the same as the modifier 32 of FIGURE 1, including all descriptions thereof.

All of the other embodiments shown in the various figures of this application may be used in connection with electrical heaters substantially in the same manner as in FIGURE 1A without further description thereof or reference thereto.

The modifier 32 of FIGURE 1 may be energized to reduce the temperature setting of the thermostat 26 to a lower temperature without turning of the knob 28. For example, the modifier 32 may automatically change the setting of the thermostat 26 from a setting of 300° F. by the knob 28 down to a temperature of 170° F., or the like, without changing the position of the knob 28 from the 300° F. setting. For example, the article or roast 22 may be cooked or roasted in the oven 20 at a temperature of 300° F., under the control of thermostat 26 when operating at the knob 28 position of 300° F. until the interior of the roast, as measured by the meat probe 30, reaches a selected temperature such as 140° F. When the interior of the roast reaches a 140° F. temperature, the modifier arm, or heat motor arm 136, may move from its full-line, unenergized lower position to an upper, energized position 136A to raise the thermostat head 64 from the 300° F. position 76B of FIGURE 1B to modified position 76A, which corresponds to a thermostat setting of 170° F. This causes the thermostat arm 66 to fulcrum over point 76A instead of over the point 76B which it had previously been doing. The position 76A of the head 64 is attained while the knob 28 still remains at the 300° F. position.

In order to avoid complicated wiring, the probe 30 which is shown in oven 20 is also shown diagrammatically at 30A at the left end of FIGURE 1 to show how the probe 30 automatically controls the modifier 32.

The probe 30 may contain a resistance 142, the electrical resistance of which decreases as the temperature of the meat probe 30 rises, and vice versa. That is, when the temperature of the meat probe rises, the electric current which can pass through the resistance 142 increases and vice versa.

When the meat probe 30 is inserted in the article 22, and the connector plug 144 is inserted into connector receptacle 145 a circuit is produced, starting at 146, passing through resistance 142, through line 148, heater resistance 150 and line 152 to the end 154. This circuit may be a 12-volt circuit, if desired, which may be produced by the secondary winding 156 of the transformer 158 which is connected to regular lines L' and L".

The heater resistance 150 is adjacent to a bi-metal strip 160 which may bend upwardly when sufficiently heated and contact adjustable contact 162. When contact is made, the modifier heater 164 is placed between the lines L' and L" to heat the heat motor or modifier 32, which has a sealed diaphragm or bellows 166. When the bellows 166 is heated, the sealed fluid expands the bellows to the dotted line position 166A, which rocks the rod 136 about the fulcrum 168 to the heated position 136A.

The rod or lever 136 has a curved end 172, which moves upwardly to position 172A. This pushes the head 64 to the 170° F. position, from the 300° F. position since the hook 172 engages the bottom 78 at position 78B and pushes it up to the position 78A, so that the fulcrum 76 rocks over the fulcrum at position 76A.

The head 64 can be lifted by the rod 136 because of the expandable joint 58 which permits the upper rod 62 to be lifted upwardly with its end 70 lifting up from the bottom 68 of the fork 58.

This causes the lever 66 to rock about the point 76A.

While the thermostat 26 was operating at the 300° F. temperature setting, the oven 20 and bulb 82 had risen to the 300° F. temperature so that the bellows fulcrum 86 was rocking the thermostat arm 66 about the position 76B, so that the valve 90 was opened and closed by a slight rocking movement to maintain the oven at 300° F.

When the temperature of the meat probe 30A rose to 140° F., the resistance of the winding 142 decreased sufficiently to permit a flow of current through heater 150 sufficient to bend the bi-metal 160 upward to close it on adjustable contact 162. This causes the heating of the heater member 164 from the lines L', L" and the upward movement of the fulcrum point 167 of the lever 136 up to the point 167A. This pushes the fulcrum point from the 300° F. position 76B to the 170° F. position 76A. This immediately causes the lever 66 to rock about the fulcrum 86B, past the fulcrum 76A and up to the overshoot position 106A to maintain the valve plunger 90 closed for a considerable period of time during which the oven 20 gradually cools down to the 170° F. temperature. The fulcrum lever 66 will rock back and forth substantially along the dotted line 66A to open and close the valve 90 to maintain the oven 20 at the 170° F. temperature which is a holding temperature to maintain the roast 22 at a palatable and warm temperature. The 170° F. oven temperature produces substantially no rise in the interior temperature of the meat and produces substantially no cooking action for a relatively long period of time.

The contact 162 may be adjusted by the rotatable shaft 180 which carries the adjustable lever 182 and which may be adjusted by means of the knob 184. The shaft 180 may be provided with a pointer 186 which points to a temperature scale 188 which may indicate temperatures, for example, between 130° F. and 190° F., at which the probe temperature becomes effective to modify the oven temperature downward. Movement of the contact 162 farther away from the bi-metal 160, will require the probe resistance 142 to be heated slightly higher and vice versa. This permits selection of the temperature at which the internal roast or probe temperature becomes effective to modify the oven temperature downward.

The upward travel of the heat motor lever 136 may be stopped by the head 192 of the adjustable screw 194. The screw 194 may be upwardly and downwardly adjusted to select the modifying temperature, so that such modifying temperature may be adjusted between any desired limits, such as from 130° F. to 190° F. or the like.

The temperature conditions of the system shown in FIGURE 1 are illustrated in FIGURE 2. The line 40, 33, 34, indicates the oven temperature produced by setting the knob 28 at 300° F. and causing the bulb 82 to operate the thermostat 26 to maintain the oven 20 at 300° F. with the valve plunger 90 cycling to produce temperature line 34 to maintain an average oven temperature of 300° F.

The interior of the roast 22, as sensed by the probe resistance 142 at this time is indicated by the line beginning at 40, and gradually rising from a temperature, such as 60° F., gradually rising along the line 38 to the point 42 where the interior of the meat has reached 140° F. and has caused the heat motor 32 to set the thermostat control down to a 170° F. setting. The meat and probe temperature of 140° F. causes bellows 166 to be heated by the heater 164, to move the lever 136 to the position 136A and to move the thermostat fulcrum 76 from the 300° F. position 76B to the 170° F. position 76A. This temporarily stops the cycling of the valve 90, which remains closed during a period of time while the oven temperature falls along the line 43 from the 300° F. level to the 170° F. level. At this 170° F. oven temperature the fulcrum 86 assumes the position 86A at which position the lever 66 may oscillate back and forth substantially along the dotted line 66A to open and close the valve plunger 90 sufficiently to heat and cool the oven 20 as indicated by the oscillating line 36 of FIGURE 2 to maintain an average temperature of 170° F. During that time, the interior of the roast remains substantially at 140° F., and the meat is maintained at a palatable warm temperature without any substantial cooking action taking place.

It has been found that some types of roasts have the outer parts of the roast cooked slightly more than desired by the action of the system of FIGURE 1 and with the heating results shown in FIGURE 2.

FIGURES 3 and 4 show a system wherein the probe becomes initially sensitive to the temperature of the roast at some relatively lower temperatures such as at 80°, as shown at 48 in FIGURE 4, so that the 300° cycling of the oven or cooking device 20 which is shown at 51 starts to have a series of long cooling periods, as indicated at 50, so that the temperature of the oven or cooking device begins gradually to be lowered by these long cooling periods until the temperature of the oven is brought to the 170° temperature as shown at 53 at which time the meat temperature has risen to 140° as shown at 55. After this the oven is cycled as shown by the oscillating line 57 to maintain the interior of the meat substantially at 140° as indicated at 59. The meat remains at a palatable temperature without substantial further cooking at this 170° oven temperature.

FIGURE 3 shows a system in which practically all of the parts are substantially the same as in FIGURE 1. Where such parts are substantially the same, such parts are not necessarily provided with reference characters or described, and reference is made to FIGURE 1 for the operation and construction of these parts.

In FIGURE 3, a resistance 202 is provided which can be placed in parallel with the probe resistance 142 of FIGURE 1. The resistance 142 is shown having one prong connected to the ground 204 and the other prong connected to the line 148. The resistance 202 of FIGURE 3 may be placed in parallel with the resistance 142 by the switch 46 which can connect and disconnect resistance 202 with ground 210. Switch 46 may have a stationary leaf 206 and a flexible leaf 208. When the switch 46 is closed, as shown in full lines in FIGURE 3, then the resistance 202 is grounded at 210 in parallel with resistance 142 which is grounded at 204.

The resistances of members 142 and 202 are such that when the probe resistance is below 80°, then member 142 has too much electrical resistance, so that even with the parallel resistance 202, insufficient current flows through the heater 150 to close the contacts 160 and 162. This permits the oven to cycle at 300°, as shown at 51 in FIGURE 4, since the diaphragm 166 is not heated by heater 164. However, when the temperature of the probe 30A and the interior of the meat rises to 80° and above, then the resistance of member 142 has begun to decrease sufficiently in value, so that sufficient current can now pass through the resistance 142 in parallel with the resistance 202 to allow sufficient current to pass through the heater 150 to close the contacts 160 and 162. When these contacts 160 and 162 are so closed, as indicated by the dotted line 160A, then the heater 164 of the heat motor 132 is heated to move the heat motor lever 136 to the 170° position 136A. This adjusts the thermostat 26 to the 170° position while the oven remains at 300°, and starts an oven cooling cycle 50, as shown in FIGURE 4.

The thermostat 26 is then restored to the 300° setting for a short period of time to produce a short heating period 50A, FIGURE 4. Thereafter a series of relatively long cooling and relatively short heating periods 50 and 50A are repeated so that average temperature of the oven falls to 170° at which temperature the oven is maintained indefinitely by the bulb 82 and diaphragm 80 as shown by oscillating line 57 of FIGURE 4.

The cycling at 50 and 50A is produced by alternately opening and closing contacts 160 and 162 and switch 46 so resistance 202 is alternately connected and disconnected with ground 210. This alternately heats and cools modifier bellows 166 alternately to set the thermostat 26 at 300° and 170° settings to produce heating and cooling periods 50 and 50A.

The switch 46 is opened and closed by an actuating member 212 which is movable up and down by the end 106 of the thermostat lever 66. The member 212 has an arm 214 which engages the flexible leaf 208 to open the switch 46 whenever the end 106 of thermostat lever 66 overshoots upwardly a slight amount above the "OFF" position which is shown in full line at 106.

The action which takes place in FIGURE 3 will now be described.

The probe 30A is inserted in a roast 22 in the oven 20. The knob 28 is turned to 300°, to position the head 64 with the fulcrum 76 at the position 76B (see also FIGURE 1B) and with the contacts 160 and 162 in open position, because of the high electrical resistance of the member 142 with the probe in cold condition. With these factors operating, insufficient current passes through heater 150, and it cannot close the contacts 160 and 162. The heat motor 32 cannot be energized, and the heat motor lever 136 is in the lower position or inactive position, so that it cannot interfere with the lowermost position of the head 64 with the fulcrum at 76B. Under these conditions, the burner 24 is ignited by the opening of the valve plunger 90 and remains open until the oven 20 relatively quickly reaches the temperature 300° F. The oven temperature under these conditions rises from the point 41 in FIGURE 4 and moves along the line 63 to heat the oven 20 relatively rapidly, up to the temperature 300° F., while the bulb 82 in the oven 20 moves the diaphragm 80 to the 300° F. position at 86B. This causes the diaphragm 80 at 86B to cycle the lever 66 along the dotted line 66B to open and close the valve plunger 90 in a manner to maintain the oscillating line 51, FIGURE 4, with an average of 300° F. temperature caused by the opening and closing of the valve plunger 90 in succession. During this time the switch 46 remains closed, and current can flow in parallel through the resistances 142 and 202 in parallel. However, because of the high resistance of member 142 in cold condition, as indicated by the meat temperature line 65, which is below the 80° F. temperature, still maintains sufficient resistance to the flow of current through the heater 150 so the heater 150 cannot close the contacts 160 and 162 and thus cannot cause the heat motor 32 to become energized, so that the oscillating oven temperature is maintained at an average of 300° F. along the oscillating line 51 of FIGURE 4.

When the internal meat temperature at the probe reaches the 80° F. temperature as indicated at the point 48 of FIGURE 4, the resistance of member 42 has decreased to the point where the parallel flow of current through the members 142 and 202 permit sufficient current to pass through the heater 150 to close the contacts 160 and 162 as indicated by the dotted line 160A. At this time the oven temperature is 300° F., so that the diaphragm 80 is in position 86B and the closing of the contacts 160 and 162 causes the heat motor 32 to move the arm 136 to position 136A. When the heat motor 32 moves the lever 136 to the position 136A, then the fulcrum 76 is moved from position 76B to the position 76A. This causes the thermostat lever 66 to assume the position shown by the dotted line 66D which causes the end 106 to assume the position 106A and which causes the member 214 to assume the position 214A' which raises the leaf spring 208 to the position 208A and which opens the switch 46 and circuit of resistance 202, so that current for the heater 150 can only pass through the probe resistance 142. However, the amount of current which can flow through the probe member 142 which is at approximately only 80° F. is insufficient to cause the heater 150 to maintain the contacts 160 and 162 closed, so they open. The opening of these contacts 160 and 162 in turn de-energizes the heater 164 of the heat motor 32. This cools the heat motor 32 and causes the arm 136 to return from the upper position 136A toward the position 136. With the temperature in the oven only slightly below 300° F., the diaphragm 80 is still substantially at position 86B, or slightly above it, so that the lever 66 which is now fulcrumed at 76B because of the cooling of the heat motor, now opens the valve plunger 90 and starts the oven to heat. However, with the lever 66 in substantially the position of 66B, or only slightly altered the end of the lever 66 is now back to or slightly below 106 so that the switch 46 now closes and permits current to flow through the resistance 202 in parallel with the resistance 142.

Since the probe 30A now is slightly warmer, the current flowing through 142 is slightly more than it was before, which in parallel with the flow through resistance 202 causes the heating action at 150 again to close the contacts 162 and again to heat the heat motor 32 and again to move the fulcrum head 64 to position 76A and again to open the switch 46.

It is thus to be seen that an alternating heating action for the heat motor 32, with the switch 46 closed, alternates with a cooling action for the heat motor 32 when the switch 46 is opened. This alternating action takes place because of the generally upward slanting positions of the lever 66, such as 66B, as the diaphragm 80 remains in positions below the 200° F. mark which are maintained by the oven 20 being at a temperature above 200° F. This alternating heating and cooling of the heat motor 32 causes the pulsations 50, 50A of FIGURE 4, which have relatively long cooling periods, and short heating periods, which cause oven temperature gradually to diminish as shown by the pulsations 50. All this time, however, the meat temperature is rising as indicated by the line 49 until the oven temperature cools down to 200° F. at the point 67 of FIGURE 4. When the oven temperature reaches or cools to 200° F., the diaphragm 80 assumes the position 86F which produces a thermostat lever condition as indicated by the dotted line 66F, in which the lever 66 rocks back and forth substantially along the line 66F with the right end 106 substantially the same as 106 except just slightly above, so that the member 214 can only rise to the position 214F which is insufficiently high to open the switch 46. Hence the switch 46 remains closed and maintains the resistance 202 in parallel with the resistance 142, so that the resistance 202 cannot be de-energized any more and the heat motor 32 remains in heated condition with the lever 136 at position 136A. This creates a condition, wherein the fulcrum 76 remains at position 76A, and the thermostat diaphragm 80 oscillates back and forth substantially at a level slightly above position 86F to open and close the valve plunger 90 only sufficiently to maintain the oven temperature at 170° F., as indicated by the oscillating line 57 of FIGURE 4. Under these conditions the interior of the meat remains substantially at 140° F., without any substantial further cooking. However, the roast is maintained at a palatable temperature for a substantially indefinite period of time without further cooking. The action shown in FIGURE 4 as compared with FIGURE 2, tends to cook the entire roast more evenly than in FIGURE 2 with the outer surfaces not quite as well done as in FIGURE 2, which is a condition preferred by many persons.

It is thus to be seen that with the system of FIGURE 3, the oven is quickly heated as by line 63 to a temperature of 300° F. and the meat interior temperature gradually rises from the point 41 to the point 48 during which time the cycling of the oven maintains a substantially constant 300° F. temperature as indicated by oscillating line 51. At 48 (80° F. meat temperature), a series of energizations and de-energizations of the heat motor 32 are produced by the opening and closing of the switch 46 and the opening and closing of contacts 160 and 160A in a manner gradually to decrease temperature of the oven as indicated by long cooling pulsations 50 and short heating pulsations 50A, until the oven temperature cools to 200° F. At 200° F. the long cooling pulsations can no longer be produced because of the almost level condition of the thermostat lever 66 as indicated at 66F.

The meat temperature rises to 140° F. at the point 55, when the oven temperature has cooled to 170° F. as indicated at 53. Thereafter, the oven may be cycled sufficiently to maintain the oven temperature at 170° F., while the internal meat temperature remains substantially constant at 140° F. for an indefinite period of time and in readiness for serving at a desired time.

The systems of FIGURES 1 and 3 may be used with any type of thermostat which can be set at a relatively high temperature and a relatively low temperature by some automatic device. The pilot construction and burner construction shown in these figures may be of any suitable type having a proper cycling action to obtain the results herein disclosed. A system having separate standby and igniting pilots may be used, if desired.

Users of this system having the probe construction of applicant's invention sometimes may find it convenient to use another improvement of applicant's invention in which a timer 220, FIGURE 5, may be added to the systems of either FIGURE 1 or FIGURE 3.

FIGURE 5 shows a timer 220 being used with a system which, without the timer, is substantially the same as in FIGURE 3. The system of FIGURE 5 has warning lights such as oven ready light 222 which is illuminated by switch 215 while the oven is at a temperature just slightly below the setting of thermostat 26 and is extinguished when the oven temperature is at or above the thermostat setting. However, the switch 215A of FIGURE 5A may be used. Switch 215A is open and oven ready light 222 is extinguished while the oven temperature is below the thermostat setting (such as setting 300° F.). The switch 215A is closed and light 222 is illuminated when the oven temperature has reached a temperature slightly below the set point 300° F. Another light 224 may be added, and this light illuminates when the oven thermostat has been turned to a temperature position (such as 300° F.) by the knob 28 and when certain timer positions have been fulfilled. Another light 226 is illuminated to indicate an oven hold position in which the oven holds the particular position being indicated until the thermostat knob is turned to the "OFF" position.

The remainder of the details of the thermostat 26, oven 20, probe 30, and modifier 32 may be substantially the same as in FIGURE 3. Several reference numerals of FIGURE 3 are applied to identify the similarity, and no description thereof is believed necessary and is not repeated.

The timer 220 is added and is elsewhere further described.

FIGURE 5 shows the system in a condition so the user can choose several methods of cooking a roast or the like or to produce baking operations, etc.

For example, the user may choose to leave the timer handle 228 in the manual position 230. The timer also has other positions indicated by 232, 234, 236, 238, 240, 242, 244 and 248. It operates a plurality of cams 302 by shaft 221 which is rotated by handle 228 which is returned clockwise by timer motor 270. The cams 302 close and open the contacts GF, BA, EDM, and HI as shown in FIGURES 6–17.

The user may obtain oven cooking at a selected temperature, such as 300° F., more or less, by turning knob 28 to 300° F., more or less, and leaving the timer handle 228 at manual position 230. The oven 20 then automatically heats to the temperature 300° F., or other selected temperature, and remains at that temperature indefinitely until the user decides to turn off the oven by turning the knob 28 to the "OFF" position. This type of operation is convenient and preferred for certain conditions, but the user may overcook the food if the thermostat handle 28 is not turned to "OFF" as soon as the food is cooked.

The user may choose to move the timer handle 228 to any position in the zone indicated by the arc 252 on the face 220 of the timer such as from the position 1 (one hour) through to 8 (eight hours) as desired. The user may also turn the thermostat knob 28 to some temperature such as 300° F. or the like. Preferably the meat probe 30 is removed from the oven and the probe plug 144 is removed from the plug receptacle 145. For example, the handle 228 may be set at "4" (four hours), as shown in FIGURE 6. The oven thermostat handle may be set at 300° F. The oven will then be raised to and maintained at 300° F. for a period of time of about 3 hours and forty minutes until the handle 228 is returned by timer motor 170 to the point 232 as shown in FIGURE 7. While the handle 228 was traveling from 4, for example, to point 232, the oven is maintained at 300° F. with the "oven on" light 224 illuminated all the time and the "oven ready" light 222 illuminated when the oven is heated at any temperature just below 300° F. and is extinguished when the oven is heated at or above 300° F. "Oven on" light 224 is illuminated throughout this period of time by the closing of switch KN when the knob 28 is turned from the "OFF" position to the "ON" position which automatically moves the contact K into contact with N contact by the connection 256 (a rod or the like) with the shaft 62. The light 222 is extinguished whenever the thermostat lever 66 "overshoots" in the manner shown in FIGURE 3, when the oven temperature "overshoots" the thermostat setting the end 106 is raised substantially above the "OFF" position. The rod 212 has an extension 212A and a sidewise arm 214A which engages and opens switch 215 in the "overshoot" position of lever 66.

However, if it is desired to have the oven ready extinguished at any temperature just below 300° F., and illuminated at temperatures at and above 300° F., then the switch 215A of FIGURE 5A may be substituted for switch 215 of FIGURE 5. The switch 215A is spring biased in open position and is closed by arm 214A when the oven temperature is in "overshoot," such as above 300° F.

When the timer handle 228 reaches the position 232, as shown in FIGURE 7, the heater 164 of the heat motor 32 is energized and causes a cooking operation at a lowered temperature, such as 170° F. by the raising of the arm 136 to the position 136A of FIGURES 1 and 3. This causes a cooking operation at the 170° F. temperature as the handle 228 moves from the position 232 until the handle 228 reaches the position 236 in FIGURE 9. When the handle is at 232, the light 224 lights continuously, throughout FIGURES 7, 8, and 9 as the handle 228 is driven by timer motor 270 to the position 236 in FIGURE 9. When the handle 228 reaches the position 234, FIGURE 8, the hold light 226 is additionally illuminated by the closing of timer contacts GF to indicate that the cooking operation has reached a position 234 just a few minutes before the zero position 236.

The "oven ready" light 222 is extinguished whenever the thermostat arm 66 "overshoots" throughout FIGURES 6-9.

However, if switch 215A of FIGURE 5A is used instead of switch 215 of FIGURE 5, then the "oven ready" light is illuminated when the thermostat arm 66 "overshoots."

When the knob reaches the position 236 of FIGURE 9, the timer handle 228 stops and the oven remains heated at 170° F. or similar thermostat setting temperature until the thermostat knob 28 is turned to the "OFF" position as indicated in FIGURE 10. When the knob 28 is turned to the "OFF" position, as in FIGURE 10, then the timer handle 228 is driven by the timer motor 270 clockwise to the positions 238, 240, 242 and 230 of FIGURES 11, 12, 13 and 14 respectively, and stops at 230, FIGURE 14. As the handle reaches the position 242 of FIGURE 13 a switch HI is closed just a few seconds before the handle 228 reaches the "manual" position 230 of FIGURES 14 and 1.

The switch HI, when closed, makes it possible to select and use the probe operation of FIGURES 15–17 instead of the timed high and low temperature cooking which is produced in FIGURES 6 through 14.

The user may choose to use the probe controlled operation substantially identical to that described in connection with FIGURE 3. This is accomplished by having the timer knob 228 at "manual" position 230, FIGURE 15, plugging in the plug 144 of the meat probe 30 at the plug receptacle 145, FIGURE 5, inserting the probe 30 into the roast 22 (as shown in FIGURE 3) and setting the thermostat knob 28 at 300° F., more or less, all as indicated in FIGURES 3, 5 and 15. Under the conditions of FIGURE 15, the heating action at 300° F. will be produced without causing any motion of the timer handle 228 and without energizing the heat motor heater 164 to produce the 300° F. cooking action which is shown at 51 in FIGURE 4. The circuits for the heat motor heater 164 and the timer motor 170 remain dormant, as shown by dotted lines, because the contacts 160 and 162 cannot be closed by te cold probe resistance 142, as explained in connection with FIGURE 3.

FIGURE 15 produces oven cycles 51 and meat temperature curve 65 of FIGURE 4.

When the internal meat temperature reaches 80° F. as shown at 48 in FIGURE 4, a turning on and off of the heater 164 of the heat motor 32 will be produced in the circuit, as shown in FIGURE 16, by the cycling action heretofore described in connection with FIGURE 3, and which is produced by the opening and closing of the switch 46 and by the opening and closing of the contacts 160, 162 and by the heated condition of probe resistance 142 and by the addition or removal of the parallel circuit of resistance 202 by the opening and closing of switch 46.

The timer motor 270 is energized in parallel with the heater 164, so that when the heater 164 is energized by the closing of the switch 46, then the timer handle 228 is moved slowly and intermittently from position 230 toward position 244, FIGURE 16, during which time the interior of the meat is heating from 80° F. to 140° F. along the curve 49 of FIGURE 4 with the production of cycles 50, 50A. At about the time that the cycles 50, 50A reach the position 67, of FIGURE 4, so that there is no longer any cycling of the heater 164, for the reasons given in connection with FIGURE 3, the timer handle 228 has reached the position 244, in FIGURE 16, more or less, and if desired, the timer may be indicated to have a period of time of thirty minutes for the movement of handle 228 from the position 244 to the position 248, in FIGURE 17.

During the time indicated by handle positions 228 and 228' in FIGURE 17, the thermostat operates with the heater 164 continuously energized so that the thermostat maintains the oven at 170° F. as indicated by the oscillating line 57 of FIGURE 4, and maintains the oven at 170° F. for 30 minutes. The timer continues to operate during these 30 minutes to the position 248, and is stopped by the opening by switch HI, at timer position 228' which disconnects the timer motor 270 from the line L', L".

The oven will continue to be heated at 170° F. until the thermostat knob 28 is returned to "OFF" position.

Thus it is to be seen, that with the system of FIGURE 5, the user may select a manual operation of the thermostat, in which the thermostat can be caused to operate at a selected temperature such as 300° F., more or less, for any time desired until the user elects to turn the thermostat knob 28 to the "OFF" position. During this time, the timer handle 228 has been continuously at position 230 (FIGURE 5).

On the other hand, as in FIGURES 6–14, if the user desires to produce a timed, high temperature cooking operation, at 300° F., more or less for example, followed by a timed, low temperature cooking operation, at 170° F., more or less, for example, then the user may turn the timer handle 228 of the timer to any position in the arc 252, such as at "4" which indicates four hours, FIGURE 6. The user may obtain a relatively long period of high temperature cooking, FIGURE 6, followed by a twenty or thirty minute low temperature cooking, FIGURE 7, for a total of 4 hours. The user may then have the thermostat remain at the low temperature of 170° F., FIGURE 9, as long as the knob 28 is at the cooking position of 300° F., with the heat motor energized to produce a 170° F. oven temperature. The user may then turn the knob 28 to the "OFF" position, FIGURE 10, which automatically causes the timer handle 228 to move to the manual position 230.

If the user so desires, the oven may be used under the control of probe 30 to produce a high temperature cooking operation, such as 300° F., more or less, FIGURE 15, until the interior of the meat or the like reaches a selected probe temperature (80° F. in FIGURES 3 and 5 and 140° F. in FIGURE 1) which then automatically starts a cooking operation at reduced temperatures until the temperature is definitely reduced to 170° F. or other calibrated temperature.

In FIGURES 6–17 only the timer contacts GF, BA, EDM, and HI which are live are shown, and the dead or dead ended contacts are generally not illustrated. However, in FIGURE 15 the circuits for heater 164 and timer 270 are shown in dotted condition, but they are not energized until the FIGURE 16 is reached.

The switches 46 and 215 are spring biased in closed positions, and only the upper leaf of each switch moves in upward direction to open the respective switch.

The switch KL is closed in the "OFF" position of thermostat knob 28 and is open in temperature positions of such knob.

Conversely, the switch KN is open in the "OFF" position of the thermostat knob 28 and is closed in the temperature position of such knob.

The switches GF, BA, EDM, and HI are biased in open position and are closed only when actuated by the proper hill (not shown) of the respective cam disc 302 under the control of shaft 221, timer handle 228 and timer motor 270.

The timer 220 may be of any suitable construction. For example, the timer motor 270 may be a synchronous motor and may drive the shaft 221 through a large gear reduction and through a slip clutch so the handle 228 and shaft 221 may be moved manually without necessarily turning the motor. The motor will drive the shaft 221 and handle 228 when the handle is not manually held.

The temperatures given, such as 300° F., 170° F., etc., are given by way of example and other temperatures may be used in lieu thereof. Any of the thermostat temperatures in ordinary use may be chosen, merely by setting the thermostat knob 28 to the temperature desired, such as 325° F., 350° F., etc.

The internal temperature of the roast may be varied, as desired, by adjusting the knob 184 to select temperatures from 130° F. to 190° F., for example.

The lower oven temperature may be varied by vertically adjusting screw 194.

The thermostat 26 may be of any suitable construction. The modifier 32 may be of any suitable construction, and it may be actuated and may modify the thermostat 26 by a solenoid, etc., instead of by a heat motor.

Certain words are used herein which describe direction, relative position, etc., such as "vertical," "upper," "horizontal," etc. Such words are intended to apply only to the drawings and the specific illustrations therein. It is to be understood that the actual devices may have different directions, relative positions, etc.

It is thus to be seen that an apparatus and method have been providing including the use of a cooking device or oven 20, a heating means 24 for the device or oven, a thermostat 26 to control the heating means, a modifier 32 to modify the thermostat, a timer 220, and an article temperature sensing member or probe 30 in a selectively operable manner.

The timer may be set at a manual position and the thermostat may be set at a cooking position, so an article is cooked under the control of the thermostat for any desired length of time.

Selectively the timer may be set for a selected timing interval and the thermostat may be set for a selected cooking temperature. The article then is cooked at the selected temperature, such as 300° F. or 325° F., for the major portion of timing interval and is heated at a different temperature such as 170° F., more or less, for the minor final portion of the timing interval. The article may be maintained at such different temperature indefinitely after the expiration of said timing interval.

Selectively the timer may be set at manual position, the thermostat may be set at a selected cooking temperature, such as 300° F. or 325° F., and the article temperature sensing member or probe may be placed in sensing position with respect to an article to be cooked. The sensing member may also be connected with said thermostat and said modifier. The sensing or probe temperature may be selected to any desired value, such as between 130° F. and 190° F. more or less. The article may then be cooked at said selected cooking temperature until said article attains the selected probe temperature. The article temperature sensing member or probe then causes the article to be heated at a lower thermostatically controlled temperature such as 170° F., more or less, for any desired length of time.

When the article temperature sensing member or probe 30 is operating, the timer 220 may be used to indicate, in general, the length of time that the article is being heated at the lower thermostatically controlled temperature of 170° F., more or less. This temperature maintains a roast of meat or the like in palatable temperature condition for a surprising length of time without perceptible further cooking action.

If desired, the thermostat 26 and modifier 32 may be of similar construction to the thermostat and modifier disclosed in my copending United States patent application, Serial No. 416,184, filed November 23, 1964, for Clearing Timer System for Oven Controls, to which reference is made for further disclosure of said thermostat and modifier.

While the form of the invention now preferred has been disclosed, as required by statute, other forms may be used, all coming within the scope of the claims which follow.

What is claimed is:

1. In combination: a device to receive an article to be cooked by said device; heating means for said device; a thermostat controlling the operation of said heating means to maintain a first cooking temperature of said device; a temperature modifier for said thermostat to modify said thermostat to maintain a second cooking temperature for said device; a timer for timing heating operations of said heating means; an article sensing member to sense the temperature of an article while being cooked; means to cause said device, said heating means, said thermostat, and said timer to cook an article at a cooking first temperature for a first interval of time followed by heating of said article at a heating second temperature under the control of said thermostat modified by said modifier for a second interval of time; and selective electrical connection means to cause said device, said heating means, said thermostat, and said article sensing member to cook an article at a thermostat controlled first temperature until said article attains a selected article temperature, and thereafter to cause said heating means to heat said article at an article sensing member controlled second temperature.

2. In combination: an oven to receive an article to be cooked in said oven; heating means for said oven; an oven thermostat controlling the operation of said heating means to maintain a first temperature in said oven; and a probe having means automatically responsive to a change in the internal temperature of said article automatically to change the operation of said oven thermostat to maintain a heating second temperature in said oven; and a timer responsive to said change of the operation of said thermostat indicating substantially when said oven thermostat has been changed by said probe to maintain said second temperature.

References Cited by the Examiner

UNITED STATES PATENTS

| | | | |
|---|---|---|---|
| 2,150,634 | 3/1939 | Rhodes | 200—39 |
| 2,254,960 | 9/1941 | Harris | 236—9 |
| 2,372,307 | 3/1945 | Alexander | 236—51 |
| 2,489,896 | 11/1949 | Kempton | 236—46 X |
| 2,545,846 | 3/1951 | Dunn | 236—46 |
| 2,914,644 | 11/1959 | Holtkamp. | |
| 2,989,611 | 6/1961 | Weber et al. | |
| 3,032,636 | 5/1962 | Schauer. | |
| 3,090,560 | 5/1963 | Holzboog et al. | 236—46 X |

ALDEN D. STEWART, *Primary Examiner.*

WILLIAM F. O'DEA, EDWARD J. MICHAEL,
*Assistant Examiners.*